(12) United States Patent
Li

(10) Patent No.: US 11,573,003 B2
(45) Date of Patent: Feb. 7, 2023

(54) LIGHT-TRANSMITTING ASSEMBLY OF DISPLAY DEVICE, SIGNAL INDICATOR AND DISPLAY DEVICE

(71) Applicants: Hefei BOE Vision-Electronic Technology Co., Ltd., Anhui (CN); BOE Technology Group Co., Ltd., Beijing (CN)

(72) Inventor: Chao Li, Beijing (CN)

(73) Assignees: Hefei BOE Vision-Electronic Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/485,126

(22) Filed: Sep. 24, 2021

(65) Prior Publication Data
US 2022/0128751 A1    Apr. 28, 2022

(30) Foreign Application Priority Data
Oct. 28, 2020  (CN) .......................... 202022457994.3

(51) Int. Cl.
| F21V 3/04 | (2018.01) |
| F21V 3/10 | (2018.01) |
| F21V 8/00 | (2006.01) |
| G02B 5/00 | (2006.01) |
| H04N 5/00 | (2011.01) |
| H04N 7/00 | (2011.01) |

(52) U.S. Cl.
CPC ................ *F21V 3/049* (2013.01); *F21V 3/10* (2018.02); *G02B 5/003* (2013.01); *G02B 6/0051* (2013.01); *G02B 6/0055* (2013.01); *G02B 6/0058* (2013.01); *G02B 6/0088* (2013.01); *H04N 5/00* (2013.01); *H04N 7/00* (2013.01)

(58) Field of Classification Search
CPC ......... F21V 3/049; F21V 3/10; G02B 6/0058; G02F 1/133606; G02F 1/133611; H04N 5/445; H04N 7/16
USPC ................................ 348/234, 725–729, 772
See application file for complete search history.

(56) References Cited

U.S. PATENT DOCUMENTS

| 10,809,571 | B2 * | 10/2020 | Watanabe | ................. F21S 2/00 |
| 2009/0003002 | A1 * | 1/2009 | Sato | ..................... G02B 6/0061 362/341 |
| 2009/0295744 | A1 * | 12/2009 | Onishi | .................. G06F 3/0412 345/173 |
| 2010/0053063 | A1 * | 3/2010 | Ishii | ......................... H04N 5/63 345/102 |
| 2010/0232165 | A1 * | 9/2010 | Sato | ....................... B60K 35/00 362/296.01 |

(Continued)

*Primary Examiner* — Keith G. Delahoussaye
(74) *Attorney, Agent, or Firm* — IPro, PLLC

(57) ABSTRACT

A light-transmitting assembly of a display device, a signal indicator, and the display device are provided in the embodiments of the present disclosure. The light-transmitting assembly of the display device includes: a light-transmitting adjustment member including a plurality of first patterns, a light transmittance of each first pattern is less than a light transmittance of a region of the light-transmitting adjustment member other than the first pattern, and each light-shielding area ratio of the first patterns is a ratio of a sum of areas of all the first patterns in any one region of the light-transmitting adjustment member to an area of the any one region.

20 Claims, 5 Drawing Sheets

(56) References Cited

U.S. PATENT DOCUMENTS

2012/0327330 A1* 12/2012 Takahashi ............ G02B 5/0278
362/296.01
2021/0132285 A1* 5/2021 Takase .................. G02F 1/1335

* cited by examiner

LIGHT-TRANSMITTING ASSEMBLY OF DISPLAY DEVICE, SIGNAL INDICATOR AND DISPLAY DEVICE

CROSS-REFERENCE TO RELATED APPLICATIONS

This application claims a priority to Chinese Patent Application No. 202022457994.3 filed in China on Oct. 28, 2020, which is incorporated herein by reference in its entirety.

TECHNICAL FIELD

The present disclosure relates to the field of display device and indicator technologies, and particularly to a light-transmitting assembly of a display device, a signal indicator and the display device.

BACKGROUND

Along with the development of display and lighting technology, more and more electrical devices and electrical products each includes a signal indicator, and in particular, household electrical appliances, such as televisions, displays and air conditioners, each includes a display panel and a corresponding signal indicator, and these devices having the display function all belong to display devices.

SUMMARY

In a first aspect, a light-transmitting assembly of a display device is provided, including: a light-transmitting adjustment member including a plurality of first patterns. Light-shielding area ratios of the first patterns gradually change in any direction of the light-transmitting adjustment member, a light transmittance of each first pattern is less than a light transmittance of a region of the light-transmitting adjustment member other than the first pattern, and each light-shielding area ratio of the first patterns is a ratio of a sum of areas of all the first patterns in any one region of the light-transmitting adjustment member to an area of the any one region.

Optionally, the light-shielding area ratios of the first patterns gradually increase or decrease from a central portion of the light-transmitting adjustment member to a peripheral portion of the light-transmitting adjustment member, or, the light-shielding area ratios of the first patterns gradually increase or decrease from one side of the light-transmitting adjustment member to the other side thereof, or, the light-shielding area ratios of the first patterns gradually increase or decrease in a direction crossing an extension line of an edge of the light-transmitting adjustment member.

Optionally, light-shielding area ratios of the first patterns gradually increase from the central portion of the light-transmitting adjustment member to both sides thereof.

Optionally, light-shielding areas of the first patterns gradually increase from the central portion of the light-transmitting adjustment member to both sides thereof.

Optionally, light-shielding areas of the first patterns are fixed and distribution densities of the first patterns gradually increase from the central portion of the light-transmitting adjustment member to both sides thereof.

Optionally, the light-transmitting assembly of the display device further includes a light-exiting member arranged on one side of the light-transmitting adjustment member away from a light source, the light-exiting member includes a light-exiting portion and mounting portions located at both ends of the light-exiting portion, and a thickness of the light-exiting portion in a direction parallel to a light-exiting direction gradually increases from a central portion of the light-exiting portion to both sides thereof.

Optionally, the light-exiting portion includes a light-exiting surface and a light-entering surface, a cross-section of the light-entering surface in a direction perpendicular to the light-exiting direction is of an arc shape, and a center of the arc is located on one side of the light-entering surface away from the light-exiting surface.

Optionally, the light-transmitting assembly of the display device further includes a bracket. The bracket includes a light-blocking groove, and the light-transmitting adjustment member and the light-exiting member are arranged in the light-blocking groove.

Optionally, a fixing portion and a light-entering portion are arranged at a bottom surface of the light-blocking groove, the fixing portion is configured to fix the light-transmitting adjustment member and the light-exiting member, and the light-entering portion is configured to allow light from the light source to enter the light-blocking groove.

Optionally, a reflective plate is arranged at a bottom surface and a peripheral wall of the light-blocking groove.

Optionally, the light-transmitting assembly of the display device further includes a diffusion member arranged between the light-transmitting adjustment member and the light-exiting member, and a matte layer is arranged on at least one surface of the diffusion member.

Optionally, the diffusion member and the matte layer are each made of a transparent material.

Optionally, each mounting portion of the light-exiting member includes a mounting post extending in a direction parallel to the light-exiting direction, positioning holes matching mounting posts are arranged at both ends of the light-transmitting adjustment member respectively, and limiting grooves matching the mounting posts are arranged at both ends of the diffusion member respectively.

Optionally, the light-transmitting assembly of the display device further includes a light-source mounting plate arranged on one side of the bracket away from the light-blocking groove.

In a second aspect, a signal indicator is provided, including the light-transmitting assembly of the display device in the first aspect and a light source arranged on a light-entering side of the light-transmitting assembly.

Optionally, the light-transmitting assembly further includes a light-exiting member arranged at one side of the light-transmitting adjustment member away from the light source, the light-exiting member includes a light-exiting portion and mounting portions located at both ends of the light-exiting portion, a thickness of the light-exiting portion in a direction parallel to a light-exiting direction gradually increases from a central portion of the light-exiting portion to both sides thereof, and light from the light source successively passing through the light-transmitting adjustment member and the light-exiting member forms light with brightness gradient values.

Optionally, the light-exiting portion includes a light-exiting surface and a light-entering surface, a cross-section of the light-entering surface in a direction perpendicular to the light-exiting direction is of an arc shape, and a center of the arc is located on one side of the light-entering surface away from the light-exiting surface.

Optionally, the light-transmitting assembly further includes a bracket which includes a light-blocking groove, and the light-transmitting adjustment member and the light-exiting member are arranged in the light-blocking groove.

In a third aspect, a display device is provided, including a housing and a signal indicator in the second aspect coupled to the housing.

Optionally, the display device further includes a speaker mesh arranged on the housing, the light-transmitting assembly further includes a light-exiting member arranged on one side of the light-transmitting adjustment member away from the light source, and at least a part of the light-exiting member is exposed from the speaker mesh.

The additional aspects and advantages of the present disclosure will be given or may become apparent in the following description, or may be understood through the implementation of the present disclosure.

BRIEF DESCRIPTION OF THE DRAWINGS

The above and/or additional aspects as well as advantages of the present disclosure will become apparent and are easily understood in the following description with reference with the following drawings. In these drawings.

DETAILED DESCRIPTION

Figure 1:
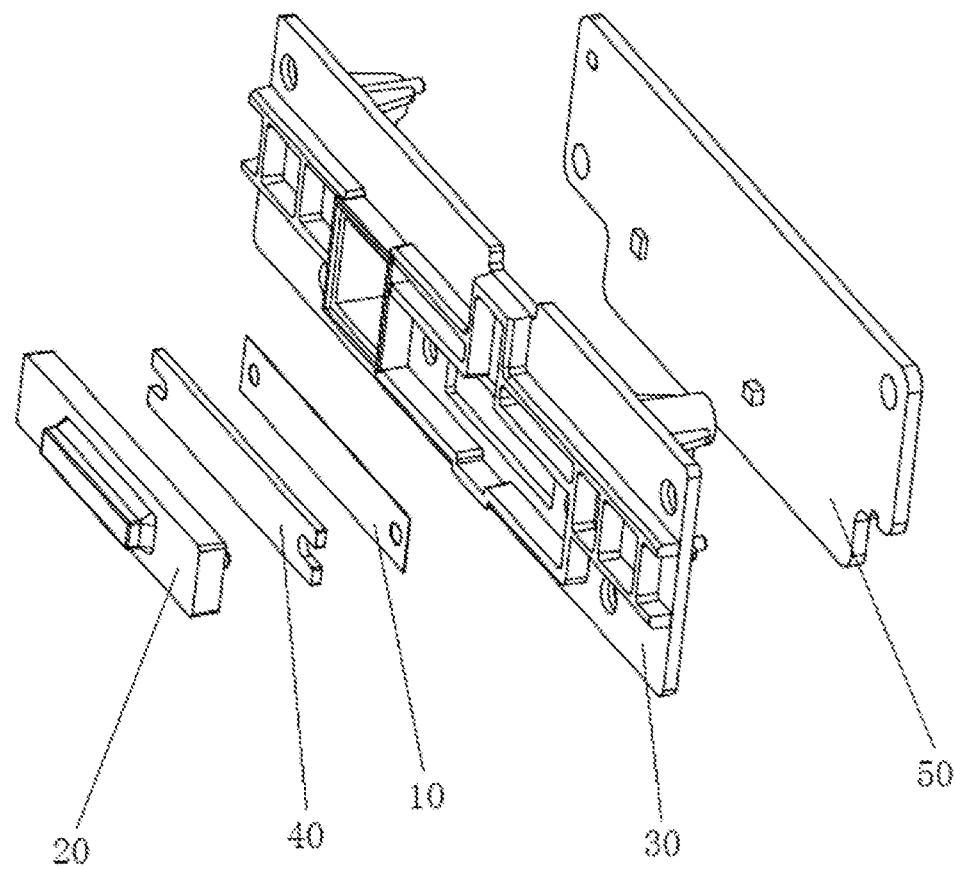
FIG. 1 is a schematic structural diagram of a light-transmitting assembly of a display device according to an embodiment of the present disclosure.

The present disclosure will be described hereinafter in conjunction with the embodiments and the drawings. Identical or similar reference numbers in the drawings represent an identical or similar element or elements having an identical or similar function. In addition, the detailed description about any known technology will be omitted when it is unnecessary to the features in the present disclosure. The following embodiments are for illustrative purposes only, but shall not be used to limit the scope of the present disclosure.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. In the case that one element is connected or coupled to another element, it may be directly connected or coupled to the other element, or an intermediate element may be arranged therebetween. At this time, the element may be connected or coupled to the other element in a wireless or wired manner. In addition, the expression "and/or" is used to indicate the existence of all or any one of one or more of listed items, or combinations thereof.

Usually, a signal indicator of a display device in the related art emits point-like or sheet-like light, which is relatively rough. In addition, in the case of no indoor lighting at night, the light emitted by the signal indicator tends to present an apparent bright spot, which makes the light emitted by the signal indicator harsh and causes inconvenience to a user.

Figure 2:
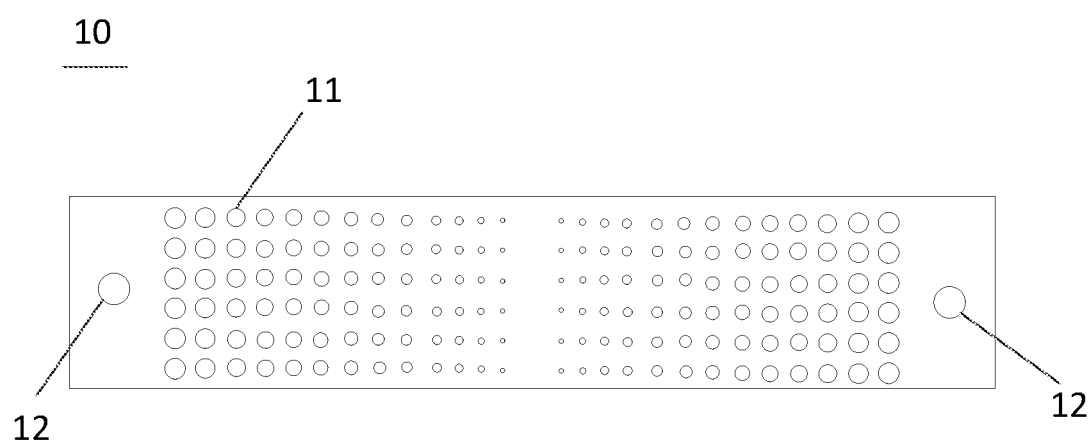
FIG. 2 is a schematic structural diagram of a light-transmitting adjustment member of the light-transmitting assembly of the display device in FIG. 1 according to an embodiment of the present disclosure.

The embodiment of the present disclosure provides a light-transmitting assembly of a display device, and a schematic structural diagram of the light-transmitting assembly of the display device is shown in FIG. 1. A schematic structural diagram of a light-transmitting adjustment member in the light-transmitting assembly of the display device is shown in FIG. 2. The light-transmitting assembly of the display device includes: a light-transmitting adjustment member 10 including a plurality of first patterns 11, light-shielding area ratios of the first patterns 11 gradually change in any direction of the light-transmitting adjustment member 10, and a light transmittance of each first pattern 11 is less than a light transmittance of a region of the light-transmitting adjustment member 10 other than the first pattern 11.

In the light-transmitting assembly of the display device of the embodiments of the present disclosure, the light-transmitting adjustment member 10 includes the plurality of first patterns 11, the light transmittance of each first pattern 11 is less than the light transmittance of the region of the light-transmitting adjustment member 10 other than the first pattern 11, and the light-shielding area ratios of the first patterns 11 gradually change in any direction of the light-transmitting adjustment member 10, so the light passing through the light-transmitting assembly has brightness gradient values. As compared with a technical solution of forming light with brightness gradient values by using multiple light-emitting elements in related technologies, it is unnecessary to use multiple light-emitting elements in the case that the light-transmitting assembly of the embodiments of the present disclosure is adopted, thereby to reduce the power consumption remarkably.

In addition, in the case of the light with the brightness gradient values, it is able to avoid a sense of discomfort to eyes of the user caused by the harsh light with too large brightness value, thereby to improve the user experience.

It should be appreciated that, in the embodiments of the present disclosure, the light-shielding area ratio of the first patterns 11 is specifically referred to as a ratio of a sum of areas of all the first patterns in any one region of the light-transmitting adjustment member to an area of the any one region.

In the light-transmitting assembly of the display device of the embodiments of the present disclosure, the plurality of first patterns 11 are arranged on one surface of the light-transmitting adjustment member 10, and the light transmittance of the first pattern 11 is less than the light transmittance of the region of the light-transmitting adjustment member 10 other than the first pattern 11, so it is able to control the brightness value of the light passing through the light-transmitting adjustment member through the light-shielding area ratio of the first patterns 11 in the light-transmitting adjustment member 10. Specifically, in the embodiments of the present disclosure, each first pattern 11 is in a form of a non-transparent black dot, the light-shielding area ratios of the first patterns 11 gradually change in any direction of the light-transmitting adjustment member through the arrangement of the first patterns 11 and an area of each first pattern, so the light passing through the light-transmitting assembly has brightness gradient values in some direction. The light with the brightness gradient values is soft to some extent, so it is able to avoid the sense of discomfort to eyes of the user caused by the harsh light with too large brightness value, thereby to improve the user experience. In an embodiment of the present disclosure, the light-transmitting adjustment member 10 includes a film sheet.

Furthermore, through the light-transmitting assembly of the display device, it is able to form the light with the brightness gradient values by using a single Light-Emitting Diode (LED). As compared with the technical solution of forming the light with the brightness gradient values by using multiple light-emitting elements in related technologies, it is unnecessary to use multiple light-emitting elements in the case that the light-transmitting assembly of the embodiments of the present disclosure is adopted, thereby to reduce the power consumption remarkably, save the energy, and protect the environment.

It should be appreciated that, in the embodiments of the present disclosure, when the light-shielding area ratios of the first patterns gradually change in any direction of the light-transmitting adjustment member, it means that the light-shielding area ratios of the first patterns gradually increase or decrease from a central portion of the light-transmitting adjustment member to a peripheral portion of the light-transmitting adjustment member, or, the light-shielding area ratios of the first patterns gradually increase or decrease from one side of the light-transmitting adjustment member to the other side thereof, or, the light-shielding area ratios of the first patterns gradually increase or decrease in a direction crossing an extension line of an edge of the light-transmitting adjustment member. The light-shielding area ratios of the first patterns may change gradually in other forms by setting different arrangements according to practical need apart from the forms described above, so as to enable the light passing through the light-transmitting assembly to have the brightness gradient values in some direction.

It should be appreciated that, the first patterns 11 may be realized in another color manner apart from a black color, so as to enable the light passing through the light-transmitting assembly to have different colors. In combination with the brightness gradient values of the light, it is able to achieve different display effects, thereby to enrich selections for the user.

In one embodiment of the present disclosure, the light-shielding area ratios of the first patterns 11 gradually increase from the central portion of the light-transmitting adjustment member 10 to both sides thereof. When the light-transmitting adjustment member is of a rectangular structure, the light-shielding area ratios of the first patterns 11 gradually increase from the central portion of the light-transmitting adjustment member 10 to both sides thereof.

In practical applications, the display device often includes a signal indicator, so as to distinguish different states of the display device. Thus, in order to prevent light emitted by adjacent signal indicators from mixing, and quickly distinguish different signal indicators, in the embodiments of the present disclosure, as shown in FIG. 2, the light-shielding area ratios of the first patterns gradually increase from the central portion of the light-transmitting adjustment member to both sides thereof. That is, the light-shielding area ratios of the first patterns gradually decrease from one side of the light-transmitting adjusting member 10 to the central portion thereof, and then gradually increase from the central portion thereof to the other side thereof. In this way, it is able for the light transmitted through the light-transmitting assembly to form the brightness gradient effect in which the light gradually darkens from the central portion of the light-transmitting assembly to two sides thereof, thereby to ensure the central portion of the light-transmitting assembly having a maximum brightness value. Thus, the user may quickly distinguish different signal indicator through lights, thereby to improve the user experience.

It should be appreciated that, in the embodiment of the present disclosure, when the light-transmitting adjustment member 10 is of the rectangular structure, the central portion of the light-transmitting adjustment member 10 refers specifically to a central portion of the light-transmitting adjustment member 10 along a length direction which is a direction parallel to an edge having a largest length among four edges of the light-transmitting adjustment member 10. Of course, the central portion of the light-transmitting adjustment member 10 may also refer to a central portion of the light-transmitting adjustment member 10 in a width direction.

In one embodiment of the present disclosure, the light-shielding areas of the first patterns 11 gradually increase from the central portion of the light-transmitting adjustment member 10 to both sides thereof. As shown in FIG. 2, the plurality of first patterns 11 are arranged on one surface of the light-transmitting adjustment member 10, and the first patterns 11 in the form of single black dot gradually become larger from the central portion of the light-transmitting adjustment member 10 to both sides thereof, so the light-shielding areas of the first patterns 11 gradually become larger, that is, the light-shielding area ratios of the first patterns 11 gradually increase from the central portion of the light-transmitting adjustment member 10 to both sides thereof.

Optionally, the light-shielding areas of the first patterns 11 are fixed and distribution densities of the first patterns 11 gradually increase from the central portion of the light-transmitting adjustment member 10 to both sides thereof. In the embodiment of the present disclosure, the central portion of the light-transmitting adjustment member 10 specifically refers to the central portion of the light-transmitting adjustment member 10 in the length direction.

In the embodiments of the present disclosure, the first patterns 11 are printed on the surface of the light-transmitting adjustment member 10 by means of ink screen printing. In order to facilitate the printing of the first patterns 11, the plurality of first patterns 11 having the same size, i.e., the light-shielding areas of the first patterns 11 being fixed and the same may be used, and by controlling the distribution densities of the first patterns 11 on the surface of the light-transmitting adjustment member 10, the distribution densities gradually increase from the central portion of the light-transmitting adjustment member 10 to both sides thereof, so as to enable the light-shielding area ratios of the first patterns 11 to gradually increase from the central portion of the light-transmitting adjustment member 10 to both sides thereof.

By using the above-mentioned two arrangement forms of the first patterns 11, the light-shielding area ratios of the first patterns 11 gradually increase from the central portion of the light-transmitting adjustment member 10 to both sides thereof. Thus, it is able for the light transmitted through the light-transmitting assembly to form the brightness gradient effect in which the light gradually darkens from the central portion of the light-transmitting assembly to two sides thereof, thereby to ensure the central portion of the light-transmitting assembly having a maximum brightness value.

It should be appreciated that the arrangement form of the first patterns 11 on the light-transmitting adjustment member 10 is not limited to the above-mentioned two arrangement forms, and other different arrangement forms may be set according to practical needs. For example, the first patterns 11 are arranged irregularly, or each first pattern 11 may be of a shape such as square, or triangular.

Figure 3A:
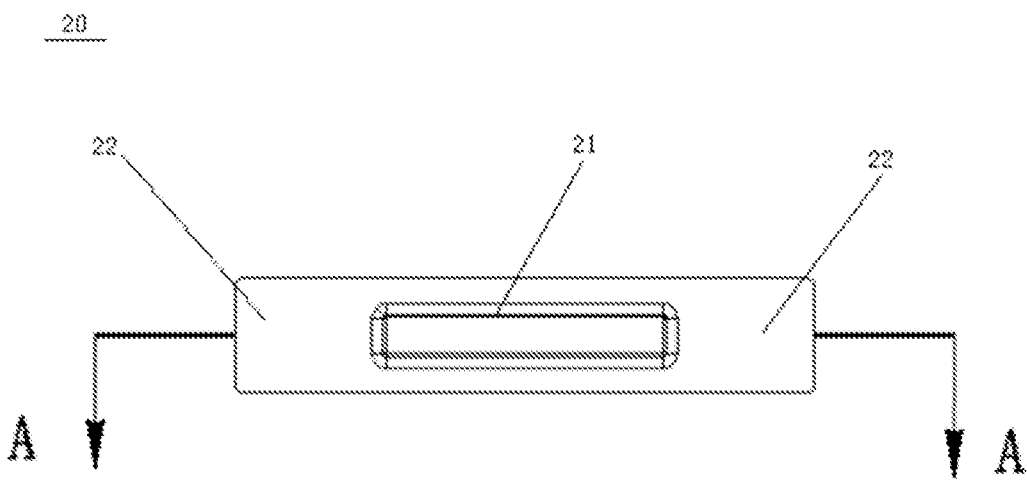
FIG. 3a is a schematic structural diagram of a light-exiting member of the light-transmitting assembly of the display device in FIG. 1 according to an embodiment of the present disclosure.
Figure 3B:
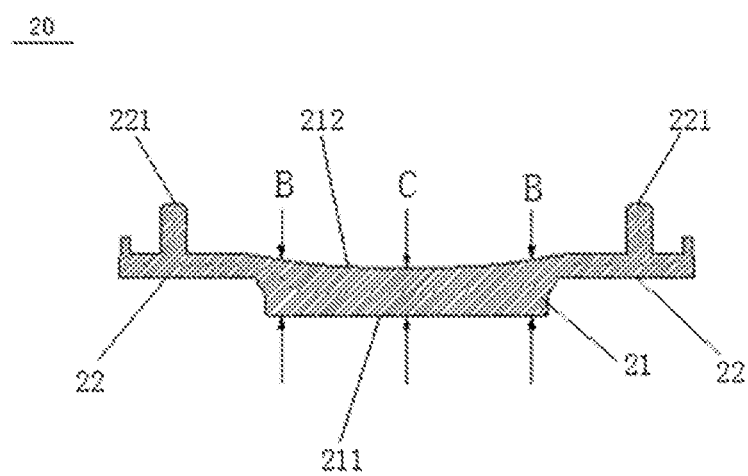
FIG. 3b is a sectional view of the light-exiting member in FIG. 3 along line AA according to an embodiment of the present disclosure.

In one embodiment of the present disclosure, the light-transmitting assembly of the display device further includes a light-exiting member 20. FIG. 3a is a schematic structural diagram of the light-exiting member, and FIG. 3b is a sectional view of the light-exiting member along line AA. The light-exiting member 20 is arranged on one side of the light-transmitting adjustment member 10 away from a light source. The light-exiting member 20 includes a light-exiting portion 21 and mounting portions 22 at both ends of the light-exiting portion, and a thickness of the light-exiting portion 21 in a direction parallel to a light-exiting direction gradually increases from a central portion of the light-exiting portion 21 to both sides thereof.

In the embodiment of the present disclosure, in order to further avoid the sense of discomfort to eyes of the user caused by the harsh light with too large brightness value and further soften the light from the light-transmitting assembly, the light-exiting member 20 is arranged on one side of the light-transmitting adjustment member 10 away from the light source, so the light from the light-transmitting adjustment member 10 scatters at the light-exiting member 20. The light exiting at positions with different thicknesses has different brightness values. For example, the light exiting at a position with a large thickness has a small brightness value, and the light exiting at a position with a small thickness has a large brightness value. Specifically, the light-exiting member 20 includes the light-exiting portion 21 and the mounting portions 22, and the thickness of the light-exiting portion 21 in the direction parallel to the light-exiting direction gradually increases from the central portion of the light-exiting portion to both sides thereof. Thus, when the light passes through the light-exiting portion 21, energy-loss amounts of the light exiting at different positions are different, and it is also able for the light from the light-exiting member 20 to achieve the brightness gradient effect, thereby to further enhance the brightness gradient effect of the light from the light-transmitting assembly.

As shown in FIG. 3b, the thickness of the light-exiting portion 21 at two ends B is greater than the thickness at the central portion C, so the light-exiting portion 21 forms a concave lens. After scattering at the light-exiting portion 21, the light is arranged in a more scattered manner. Thus, it is able to prevent the light from being concentrated in the central portion of the light-exiting portion 21, reduce the brightness value of light exiting at the central portion thereof, thereby to soften the light, avoid the sense of discomfort to eyes of the user caused by the harsh light with too large brightness value, and improve the user experience.

In one embodiment of the present disclosure, the light-exiting portion 21 of the light-exiting member shown in FIG. 3b includes a light-exiting surface 211 and a light-entering surface 212, in a direction perpendicular to the light-exiting direction, a cross-section of the light-entering surface 212 is of an arc shape, and a center of the arc is located on one side of the light-entering surface 212 away from the light-exiting surface 211.

In practical applications, in order to maintain the consistency between the light-transmitting assembly and the display device as a whole, it is required to prevent the light-transmitting assembly from protruding the display device. In the embodiments of the present disclosure, the light-exiting portion 21 of the light-exiting member 20 of the light-transmitting assembly is directly exposed from a housing of the display device, and then the light-exiting surface 211 of the light-exiting portion 21 needs to be a flat surface, so as to ensure that the light-exiting surface 211 and a surface of the housing of the display device are in a same plane. In order to ensure that the thickness of the light-exiting portion 21 gradually increases from the central portion of the light-exiting portion 21 to both sides thereof, the light-entering surface 212 of the light-exiting portion 21 is of the arc shape, and the center of the arc is located at one side of the light-entering surface 212 away from the light-exiting surface 211, so as to ensure the light-exiting portion 21 to form a concave lens, thereby to scatter the light.

Figure 4:
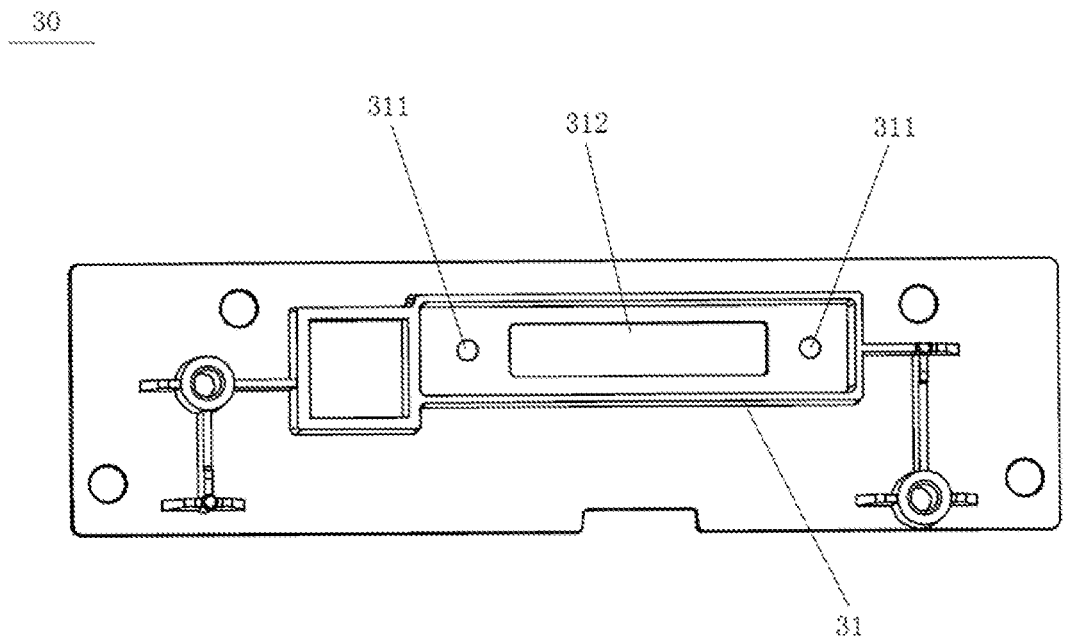
FIG. 4 is a schematic structural diagram of a bracket of the light-transmitting assembly of the display device in FIG. 1 according to an embodiment of the present disclosure.

In one embodiment of the present disclosure, the light-transmitting assembly of the display device further includes a bracket 30, as shown in FIG. 4, the bracket 30 includes a light-blocking groove 31, and the light-transmitting adjustment member 10 and the light-exiting member 20 are arranged in the light-blocking groove 31.

In the embodiments of the present disclosure, in order to avoid excessive energy loss of the light emitted by the light source before entering the light-transmitting adjustment member 10 and the light-exiting member 20, it requires a certain spatial structure to avoid the energy loss of the light. Therefore, through the bracket 30 and the light-blocking groove 31 located in the bracket 30, and the light-transmitting adjustment member 10 and the light-exiting member 20 being arranged in the light-blocking groove 31, the energy loss of the light may be effectively avoided through a peripheral wall of the light-blocking groove 31, and it is also able to prevent the light emitted by the light source from influencing other members in the display device. In addition, through the bracket 30, it also facilitates the mounting and fixing of the light-transmitting adjustment member 10 and the light-exiting member 20.

In one embodiment of the present disclosure, a fixing portion 311 and a light-entering portion 312 are arranged at a bottom surface of the light-blocking groove 31, the fixing portion 311 is configured to fix the light-transmitting adjustment member 10 and the light-exiting member 20, and the light-entering portion 312 is configured to allow light from the light source to enter the light-blocking groove 31.

In the embodiment of the present disclosure, the fixing portion 311 at the bottom surface of the light-blocking groove 31 is configured to mount and fix the light-transmitting adjustment member 10 and the light-exiting member 20, and after entering the light-blocking groove 31 via the light-entering portion 312, the light successively passes through the light-transmitting adjustment member 10 and the light-exiting member 20, so as to form the light with the brightness gradient values.

It should be appreciated that a reflective plate may be further arranged at the bottom surface and the peripheral wall of the light-blocking groove 31, and the light emitted by the light source is reflected by the reflective plate, so it is able to reduce a power of the light source and save the energy while ensuring that the light from the light-transmitting assembly meets the requirements.

In one embodiment of the present disclosure, a diffusion member 40 is arranged between the light-transmitting adjustment member 10 and the light-exiting member 20, and a matte layer 41 is arranged on at least one surface of the diffusion member 40.

Figure 5:
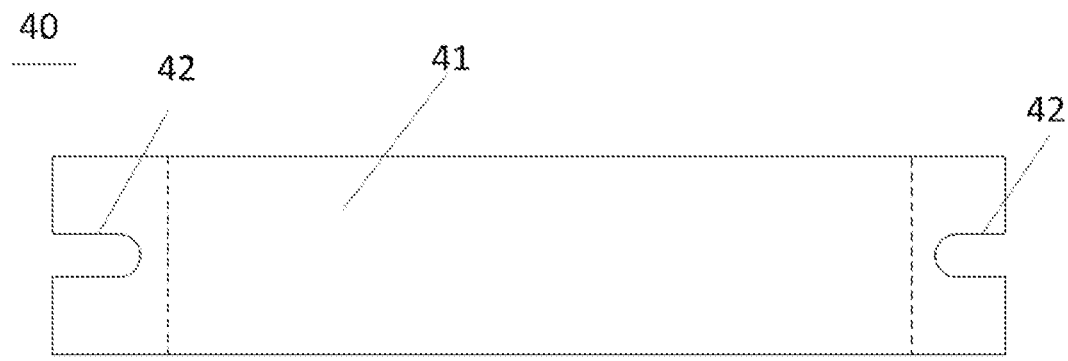
FIG. 5 is a schematic structural diagram of a diffusion member of the light-transmitting assembly of the display device in FIG. 1 according to an embodiment of the present disclosure.

In the embodiment of the present disclosure, in order to further make the light from the light-transmitting assembly softer, the diffusion member 40 is arranged between the light-transmitting adjustment member 10 and the light-exiting member 20, and as shown in FIG. 5, the matte layer 41 is arranged on one surface of the diffusion member 40, and the light may be further scattered through the matter layer 41, thereby to effectively mitigate the sense of discomfort to eyes of the user caused by the harsh light. In some embodiments, the matter layers 41 are arranged on two opposite surfaces of the diffusion member 40, so as to further scatter the light, thereby to make the light from the light-transmitting assembly softer.

It should be appreciated that, in the diffusion member 40 shown in FIG. 5, since the diffusion member 40 and the matter layer 41 are each made of a transparent material, and a boundary of the matter layer 41 is indicated by a dotted line in FIG. 5 in order to clearly show a specific position of the matter layer 41.

In one embodiment of the present disclosure, each mounting portion 22 of the light-exiting member 20 includes a mounting post 221 extending in a direction parallel to the light-exiting direction, positioning holes 12 matching mounting posts 221 are arranged at both ends of the light-transmitting adjustment member 10 respectively, and limiting grooves 42 matching the mounting posts 221 are arranged at both ends of the diffusion member 40 respectively.

In the embodiments of the present disclosure, the light-transmitting adjustment member 10 includes the positioning holes 12 matching the mounting posts 221 of the light-exiting member 20, and the diffusion member 40 includes the limiting grooves 42 matching the mounting posts 221 of the light-exiting member 20. During a procedure of mounting and assembling, the limiting grooves 42 of the diffusion member 40 are firstly clamped on the mounting posts 221 of the light-exiting member 20, and then the positioning holes 12 of the light-transmitting adjustment member 10 pass through the mounting posts 221 of the light-exiting member 20, so as to finish the fixing of the light-transmitting adjustment member 10, the diffusion member 40 and the light-exiting member 20. Next, an assembly structure where the above-mentioned three members are fixed is mounted in the light-blocking groove 31 of the bracket 30, the mounting posts 221 of the light-exiting member 20 pass through the fixing portions 311 of the light-blocking groove 31 respectively, and then the mounting posts 221 are melt thermally and fixed to the bracket 30 by using spot welding, so as to finish the mounting of the light-transmitting assembly. When the light-transmitting adjustment member 10, the diffusion member 40 and the light-exiting member 20 are assembled and fixed first, it is able to simplify the assembly of the light-transmitting assembly and improve the assembly efficiency of the light-transmitting assembly.

It should be appreciated that, in the embodiment of the present disclosure, the light-transmitting assembly further includes a light-source mounting plate 50. In some embodiments, the light-source mounting plate 50 may include a remote-control plate provided with the light source, the remote-control plate is arranged on one side of the bracket 30 away from the light-blocking groove 31. Through the light-source mounting plate 50, it is able to effectively fix the light source of the display device.

Based on the same inventive concept, the embodiments of the present disclosure provides a signal indicator including the light-transmitting assembly of the display device in each of the above embodiments and the light source arranged on a light-entering side of the light-transmitting assembly.

In the embodiments of the present disclosure, the light passing through the light-transmitting assembly has brightness gradient values, so as to enable the light from the signal indicator to have brightness gradient values, and avoid the sense of discomfort to eyes of the user caused by the light from the signal indicator, thereby to improve the user experience.

In one embodiment of the present disclosure, the light-transmitting adjustment member 10 of the light-transmitting assembly is located between the light-exiting member 20 and the light source, and the light from the light source successively passes through the light-transmitting adjustment member 10 and the light-exiting member 20, to form the light with the brightness gradient values. Thus, the light from the signal indicator has the brightness gradient values in some direction, and the light with the brightness gradient values is soft to some extent, so as to avoid the sense of discomfort to eyes of the user.

Figure 6:
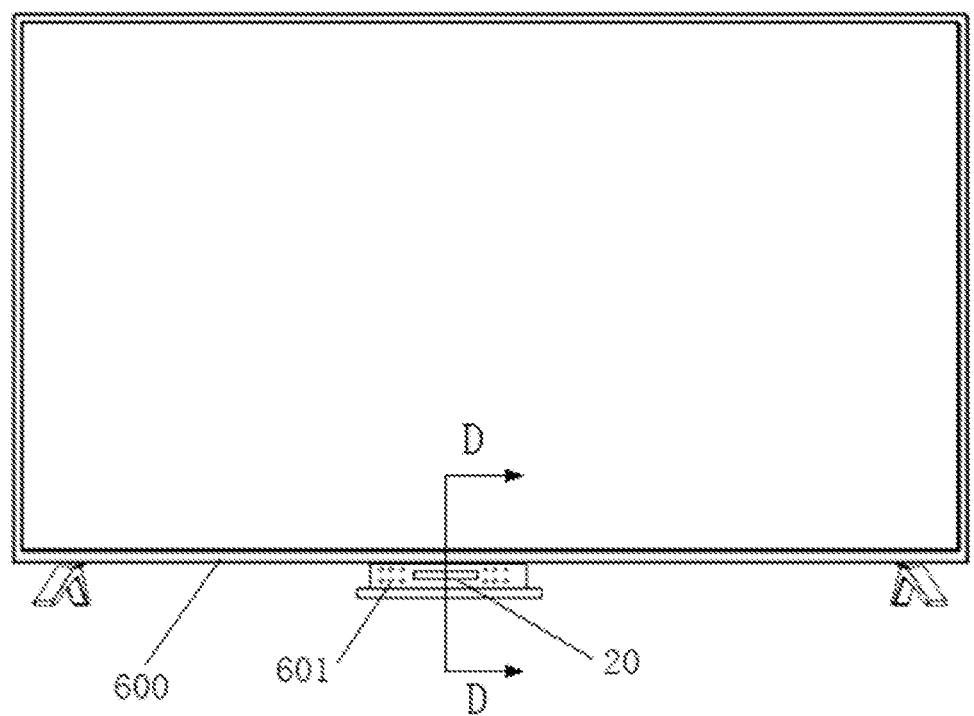
FIG. 6 is a schematic structural diagram of the display device according to an embodiment of the present disclosure.

Based on the same inventive concept, the embodiments of the present disclosure provides the display device, and a schematic structural diagram of the display device is shown in FIG. 6. The display device includes a housing 600 and the signal indicator in each above-described embodiment coupled to the housing. The signal indicator is arranged in a speaker mesh 601 of the housing 600.

Figure 7:
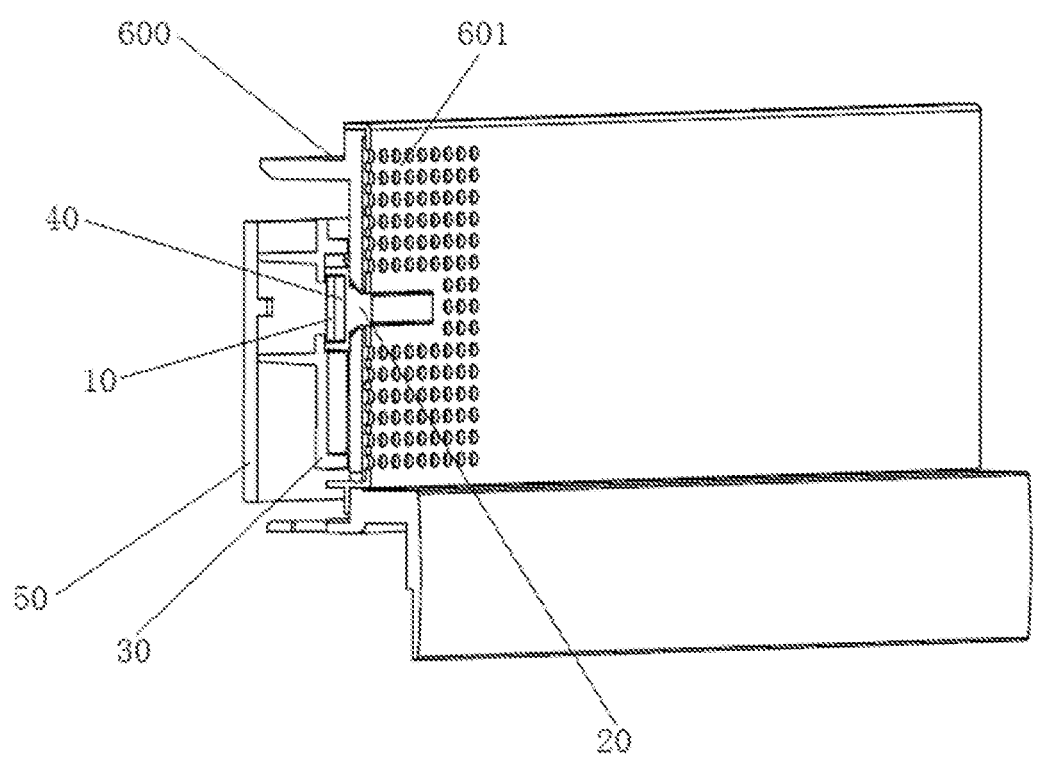
FIG. 7 is a sectional view of the display device in FIG. 6 along line DD according to an embodiment of the present disclosure.

As shown in FIG. 7, which is a sectional view of the display device in FIG. 6 along line DD according to an embodiment of the present disclosure, the light-exiting portion 20 of the signal indicator is at least partially exposed from the speaker mesh 601, so the light from the signal indicator may be seen by the user. Specifically, the signal indicator is fixed on the light-source mounting plate 50, and the light from the signal indicator passes through the light-transmitting adjustment member 10, the diffusion member 40 and the light-exiting member 20 fixed on the bracket 30, so as to form the light with the brightness gradient values, thereby to enable the light from the signal indicator to have the brightness gradient values in some direction. Further, it is able to form the light with the brightness gradient values by using a single LED, thereby to reduce the power consumption. In addition, the light with the brightness gradient values is soft to some extent, so as to avoid the sense of discomfort to eyes of the user. It should be appreciated that, FIG. 7 is mainly intended to show a position relationship between the members of the signal indicator and the housing 600 of the display device, and therefore, a display panel or the like of the display device is not shown.

In the embodiments of the present disclosure, at least the following beneficial effects can be achieved.

In the light-transmitting assembly of the display device of the embodiments of the present disclosure, the light-transmitting adjustment member 10 includes the plurality of first patterns 11, the light transmittance of each first pattern 11 is less than the light transmittance of the region of the light-transmitting adjustment member 10 other than the first pattern 11, and the light-shielding area ratio of the first patterns 11 gradually changes in any direction of the light-transmitting adjustment member 10, so that the light passing through the light-transmitting assembly has brightness gradient values. As compared with a technical solution of forming light with brightness gradient values by using multiple light-emitting elements in related technologies, it is unnecessary to use multiple light-emitting elements in the case that the light-transmitting assembly of the embodiments of the present disclosure is adopted, thereby to reduce the power consumption remarkably. In addition, in the case of the light with the brightness gradient values, it is able to avoid the sense of discomfort to eyes of the user caused by the harsh light with too large brightness value, thereby to improve the user experience.

In the above description, it should be appreciated that, such words as "in the middle of", "on/above", "under/below", "front", "back", "left", "right", "vertical", "horizontal", "top", "bottom", "inside" and "outside" may be used to indicate directions or positions as viewed in the drawings, and they are merely used to facilitate the description in the present disclosure, rather than to indicate or imply that a device or member must be arranged or operated at a specific position.

In addition, such words as "first" and "second" are merely for illustrative purposes, rather than to implicitly or explicitly indicate the number of the defined technical features. In this regard, the technical features defined with such words as "first" and "second" may implicitly or explicitly include one or more technical features. Further, such a phrase as "a plurality of" is used to indicate that there are at least two, e.g., two or three, components, unless otherwise specified.

Unless otherwise specified, such words as "install" and "connect" may have a general meaning, e.g., fixed connection, detachable connection or integral connection, or direct connection or indirect connection via an intermediate component, or communication between two components. The meanings of these words may be understood by a person skilled in the art according to the practical need.

In the above description, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A light-transmitting assembly of a display device, comprising: a light-transmitting adjustment member comprising a plurality of first patterns, wherein light-shielding area ratios of the first patterns gradually change in any direction of the light-transmitting adjustment member, a light transmittance of each first pattern is less than a light transmittance of a region of the light-transmitting adjustment member other than the first pattern, and each light-shielding area ratio of the first patterns is a ratio of a sum of areas of all the first patterns in any one region of the light-transmitting adjustment member to an area of the any one region,
wherein the light-transmitting assembly further comprises a light-exiting member arranged on one side of the light-transmitting adjustment member away from a light source;
wherein the light-exiting member comprises a light-exiting portion and mounting portions located at both ends of the light-exiting portion, and a thickness of the light-exiting portion in a direction parallel to a light-exiting direction gradually increases from a central portion of the light-exiting portion to both sides thereof,
wherein the light-exiting portion comprises a light-exiting surface and a light-entering surface, a cross-section of the light-entering surface in a direction perpendicular to the light-exiting direction is of an arc shape, and a center of the arc is located on one side of the light-entering surface away from the light-exiting surface.

2. The light-transmitting assembly of the display device according to claim 1, wherein the light-shielding area ratios of the first patterns gradually increase or decrease from a central portion of the light-transmitting adjustment member to a peripheral portion of the light-transmitting adjustment member, or, the light-shielding area ratios of the first patterns gradually increase or decrease from one side of the light-transmitting adjustment member to the other side thereof, or, the light-shielding area ratios of the first patterns gradually increase or decrease in a direction crossing an extension line of an edge of the light-transmitting adjustment member.

3. A light-transmitting assembly of a display device, comprising: a light-transmitting adjustment member comprising a plurality of first patterns, wherein light-shielding area ratios of the first patterns gradually change in any direction of the light-transmitting adjustment member, a light transmittance of each first pattern is less than a light transmittance of a region of the light-transmitting adjustment member other than the first pattern, and each light-shielding area ratio of the first patterns is a ratio of a sum of areas of all the first patterns in any one region of the light-transmitting adjustment member to an area of the any one region,
wherein the light-transmitting assembly further comprises a light-exiting member arranged on one side of the light-transmitting adjustment member away from a light source;
wherein the light-exiting member comprises a light-exiting portion and mounting portions located at both ends of the light-exiting portion, and a thickness of the light-exiting portion in a direction parallel to a light-exiting direction gradually increases from a central portion of the light-exiting portion to both sides thereof.

4. The light-transmitting assembly of the display device according to claim 3, wherein the light-shielding area ratios of the first patterns gradually increase or decrease from a central portion of the light-transmitting adjustment member to a peripheral portion of the light-transmitting adjustment member, or, the light-shielding area ratios of the first patterns gradually increase or decrease from one side of the light-transmitting adjustment member to the other side thereof, or, the light-shielding area ratios of the first patterns gradually increase or decrease in a direction crossing an extension line of an edge of the light-transmitting adjustment member.

5. The light-transmitting assembly of the display device according to claim 4, wherein light-shielding area ratios of the first patterns gradually increase from the central portion of the light-transmitting adjustment member to both sides thereof.

6. The light-transmitting assembly of the display device according to claim 5, wherein light-shielding areas of the first patterns gradually increase from the central portion of the light-transmitting adjustment member to both sides thereof, so that the light-shielding area ratios of the first patterns gradually increase from the central portion of the light-transmitting adjustment member to both sides thereof.

7. The light-transmitting assembly of the display device according to claim 5, wherein light-shielding areas of the first patterns are fixed and distribution densities of the first patterns gradually increase from the central portion of the light-transmitting adjustment member to both sides thereof.

8. The light-transmitting assembly of the display device according to claim 3, further comprising a bracket, wherein the bracket comprises a light-blocking groove, and the light-transmitting adjustment member and the light-exiting member are arranged in the light-blocking groove.

9. The light-transmitting assembly of the display device according to claim 8, wherein a fixing portion and a light-entering portion are arranged at a bottom surface of the light-blocking groove, the fixing portion is configured to fix the light-transmitting adjustment member and the light-exiting member, and the light-entering portion is configured to allow light from the light source to enter the light-blocking groove.

10. The light-transmitting assembly of display device according to claim 8, wherein a reflective plate is arranged at a bottom surface and a peripheral wall of the light-blocking groove.

11. The light-transmitting assembly of the display device according to claim 8, further comprising a diffusion member arranged between the light-transmitting adjustment member and the light-exiting member, wherein a matte layer is arranged on at least one surface of the diffusion member.

12. The light-transmitting assembly of display device according to claim 11, wherein the diffusion member and the matte layer are each made of a transparent material.

13. The light-transmitting assembly of display device according to claim 11, wherein each mounting portion of the light-exiting member comprises a mounting post extending in a direction parallel to the light-exiting direction, positioning holes matching mounting posts are arranged at both ends of the light-transmitting adjustment member respectively, and limiting grooves matching the mounting posts are arranged at both ends of the diffusion member respectively.

14. The light-transmitting assembly of display device according to claim 11, further comprising a light-source mounting plate arranged on one side of the bracket away from the light-blocking groove.

15. A signal indicator, comprising the light-transmitting assembly of the display device according to claim 3 and a light source arranged on a light-entering side of the light-transmitting assembly.

16. The signal indicator according to claim 15, wherein light from the light source successively passing through the light-transmitting adjustment member and the light-exiting member forms light with brightness gradient values.

17. The signal indicator according to claim 16, wherein the light-exiting portion comprises a light-exiting surface and a light-entering surface, a cross-section of the light-entering surface in a direction perpendicular to the light-exiting direction is of an arc shape, and a center of the arc is located on one side of the light-entering surface away from the light-exiting surface.

18. The signal indicator according to claim 16, wherein the light-transmitting assembly further comprises a bracket, wherein the bracket comprises a light-blocking groove, and the light-transmitting adjustment member and the light-exiting member are arranged in the light-blocking groove.

19. A display device comprising a housing and a signal indicator according to claim 15 coupled to the housing.

20. The display device according to claim 19, further comprising a speaker mesh arranged on the housing, wherein at least a part of the light-exiting member is exposed from the speaker mesh.

* * * * *